United States Patent [19]

Tamaki

[11] Patent Number: 4,644,425
[45] Date of Patent: Feb. 17, 1987

[54] CONTROL APPARATUS FOR CONTROLLING

[75] Inventor: Isao Tamaki, Tokyo, Japan

[73] Assignee: Sony Corporation, Tokyo, Japan

[21] Appl. No.: 719,066

[22] Filed: Apr. 2, 1985

[30] Foreign Application Priority Data

Apr. 3, 1984 [JP] Japan .................................. 59-66155

[51] Int. Cl.$^4$ ........................ G11B 15/68; G11B 31/00
[52] U.S. Cl. ......................................... 360/69; 360/71
[58] Field of Search .................................. 360/69, 71

[56] References Cited

U.S. PATENT DOCUMENTS

| 3,825,949 | 7/1974 | Pyles | 360/91 |
| 3,852,819 | 12/1974 | Staar | 360/92 |
| 3,879,758 | 4/1975 | Pyles | 360/92 |
| 4,271,440 | 6/1981 | Jenkins et al. | 360/92 |

Primary Examiner—George G. Stellar
Attorney, Agent, or Firm—Lewis H. Eslinger; Alvin Sinderbrand

[57] ABSTRACT

This invention relates to an apparatus for automatically supplying and selectively reproducing a tape cassette having a plurality of cassette accommodating racks into which a plurality of tape cassettes are accommodated, a plurality of reproducing apparatus for reproducing the plurality of tape cassettes, a tape cassette transporting apparatus for transporting the plurality of tape cassettes from the tape cassette accommodating racks to the plurality of reproducing apparatus and for transporting the plurality of tape cassettes from the plurality of reproducing apparatus to the tape cassette accommodating racks and a control apparatus for controlling at least a sequential order of reproducing the plurality of tape cassettes and a sequential order of a playback mode operation of the plurality of reproducing apparatus. In this case, the apparatus comprises a switching circuit having a plurality of reproduced signal input terminals to which reproduced output signals of the plurality of reproducing apparatus are respectively supplied and a plurality of output terminals being controlled by the control apparatus so as to supply the plurality of reproduced signals to predetermined transmission lines and a reproducing apparatus control circuit having control keys corresponding to the plurality of output terminals and for controlling the plurality of reproducing apparatus to supply reproduced signals through the switching circuit to the plurality of output terminals by operating the control keys.

2 Claims, 24 Drawing Figures

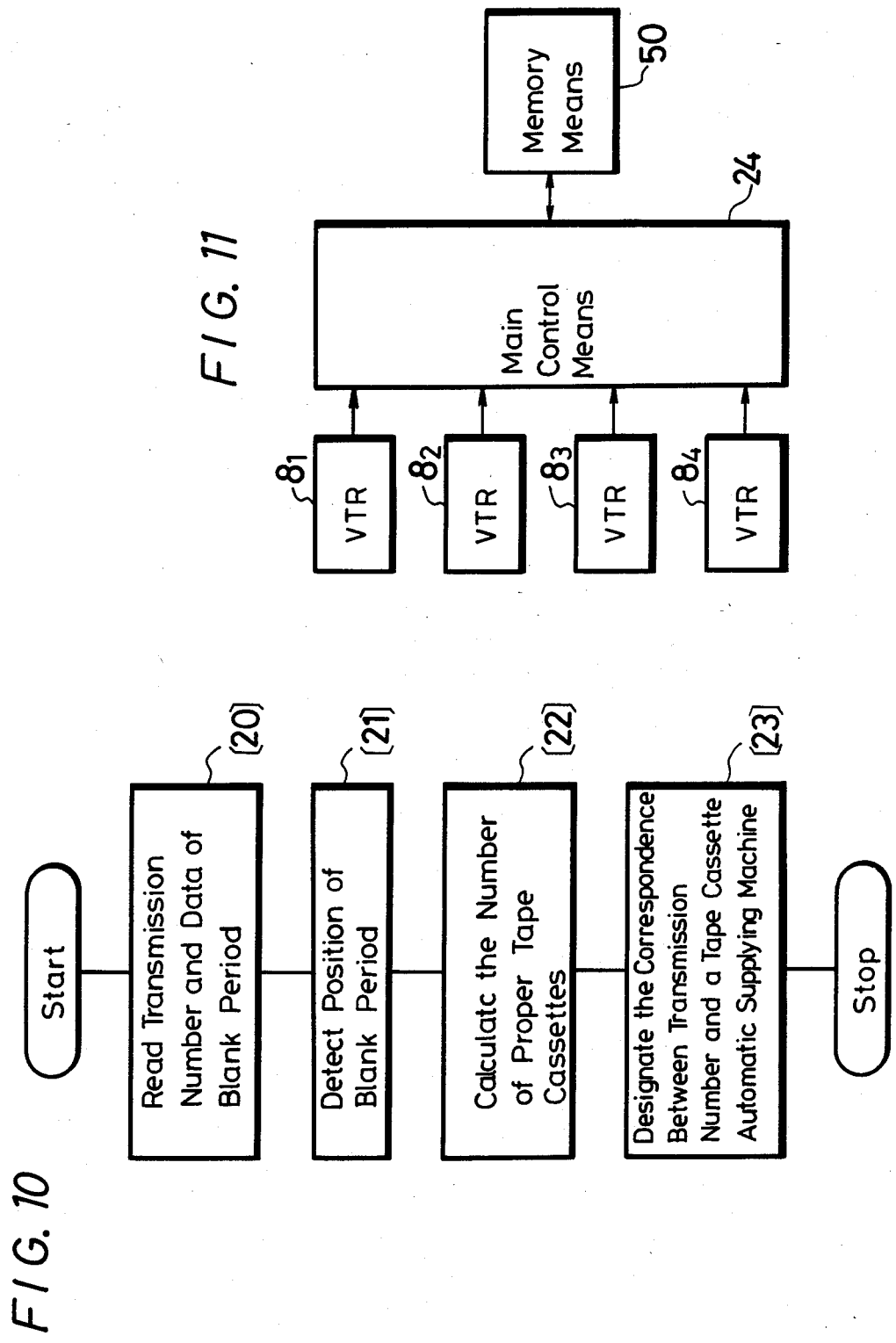

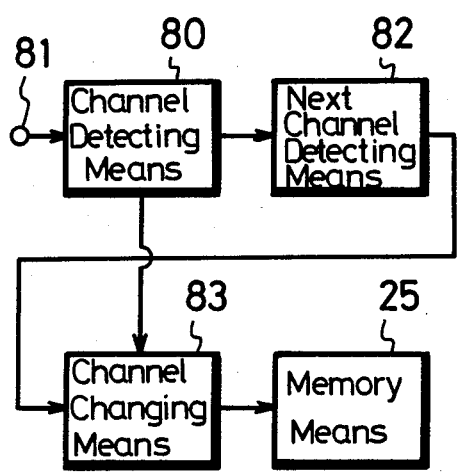
FIG. 17
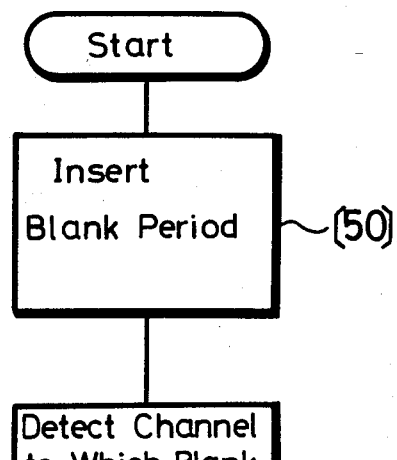
FIG. 18
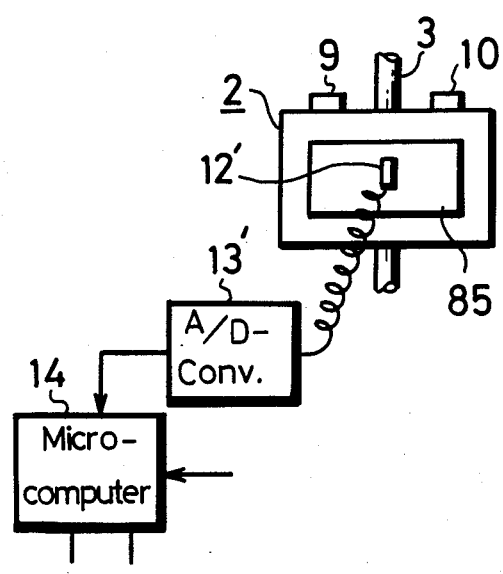
FIG. 19
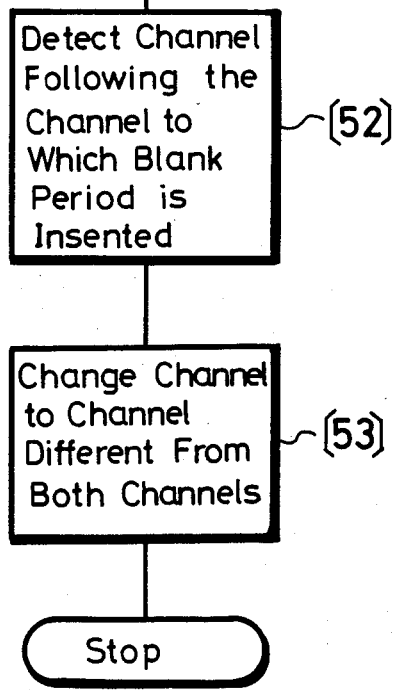

FIG. 20A

| NO | MD | TTL | STT | DRT | ACT | M | BN | CH | VT | VTM |
|----|----|-----|-----|-----|-----|---|----|----|----|-----|
| 15 | X  | X   | X   | X   | X   | 1 | 5  | A  | 2  | PLY |
| 16 | X  | X   | X   | X   | X   | 1 | 10 | A  | 3  | PLY |
| 17 | X  | X   | X   | X   | X   | 1 | 6  | A  | 4  | CUE |
| 18 | X  | X   | X   | X   | X   | 1 | 3  | A  |    |     |
| ⋮  | ⋮  | ⋮   | ⋮   | ⋮   | ⋮   | ⋮ | ⋮  | ⋮  |    |     |

FIG. 20B

| NO | MD | TTL | STT | DRT | ACT | M | BN | CH | VT | VTM |
|----|----|-----|-----|-----|-----|---|----|----|----|-----|
| 15 | X  | X   | X   | X   | X   | 1 |    | A  | 2  | PLY |
| 16 | X  | X   | X   | X   | X   | 1 |    | A  | 3  | PLY |
| 17 | X  | X   | X   | X   | X   | 1 |    | A  | 4  | CUE |
| 18 | X  | X   | X   | X   | X   | 1 |    | A  | 1  |     |

FIG. 20C

| NO | MD | TTL | STT | DRT | ACT | M | BN | CH | VT | VTM |
|----|----|-----|-----|-----|-----|---|----|----|----|-----|
| 15 | X  | X   | X   | X   | X   | 1 |    | A  | 2  |     |
| 16 | X  | X   | X   | X   | X   | 1 |    | A  | 3  | PLY |
| 17 | X  | X   | X   | X   | X   | 1 |    | A  | 4  | PLY |
| 18 | X  | X   | X   | X   | X   | 1 |    | A  | 1  | CUE |

CONTROL APPARATUS FOR CONTROLLING

BACKGROUND OF THE INVENTION

1. Field of the Invention

This invention relates to an apparatus for automatically supplying and selectively reproducing a tape cassette.

2. Description of the Prior Art

The present applicant has previously proposed the following apparatus for automatically supplying and selectively reproducing a tape cassette. An outline of this prior art apparatus will hereinafter be described briefly. In this prior art apparatus, there is provided a rack or bin apparatus which includes a plurality of tape cassette racks and the plurality of tape cassette racks respectively accommodate therein a plurality of tape cassettes in which a video signal is recorded. On the back surface of each of the tape cassette, there is attached a bar code which indicates an identifying code relating to a recorded content of a tape in the tape cassette. The tape cassettes accommodated in the bin apparatus are transported by an elevator and loaded onto a plurality of VTRs (video tape recorders), while the tape cassettes which are taken out from the VTRs are transported by the elevator and then returned to the racks of the bin apparatus. The elevator is provided with reading or detecting means for reading the bar code of the tape cassette accommodated in the bin apparatus. Then, the reproduced signals from the plurality of VTRs are selectively transmitted by a selective transmitting means.

Further, this apparatus is provided with a microcomputer which is connected to the above-described bin apparatus, the plurality of VTRs, the elevator, the selective transmitting means and so on. Further, the identifying data read out from the bar codes of the tape cassettes accommodated in the bin apparatus are stored in a memory means of the microcomputer. The microcomputer controls the plurality of VTRs, the elevator, the selective transmitting means and so on so that the recorded contents of the tapes of the tape cassettes accommodated in the bin apparatus are reproduced and transmitted in a predetermined order on the basis of the transmission list.

OBJECTS AND SUMMARY OF THE INVENTION

Accordingly, it is an object of this invention to provide an apparatus for automatically supplying and selectively reproducing a tape cassette which comprises a bin apparatus having a plurality of racks, a plurality of reproducing apparatus, an elevating and transporting means for receiving and transporting a tape cassette between the bin apparatus and the plurality of reproducing apparatus, a selective transmitting means for selectively transmitting reproduced signals from the plurality of reproducing apparatus, and a main control means for controlling the plurality of reproducing apparatus, the elevating and transporting means and the selective transmitting means, wherein playback and transmission data of the tape cassette can be inserted into a playback and transmission list of the tape cassette easily and positively.

It is another object of this invention to provide a tape cassette playback and transmission list forming apparatus in which a plurality of tape cassette playback mode and transmission numbers and a switching period of reproducing apparatus are arranged in a time sequential order and the reproducing apparatus of different channels are sequentially designated by a plurality of tape cassette playback and transmission numbers around the switching period, wherein when a new switching period is inserted between the adjacent tape cassette playback and transmission numbers in the playback and transmission list, the sequential order of the channels is not changed on the whole but changed partially, and it is possible to avoid such a defect that by the insertion of the new switching period, other existing switching period is erased to thereby make the generation of a special effect impossible.

It is still another object of this invention to provide an apparatus for automatically supplying and selectively reproducing a tape cassette which comprises a bin apparatus having a plurality of racks, a plurality of reproducing apparatus, an elevating and transporting means for receiving and transporting a tape cassette between the bin apparatus and the plurality of reproducing apparatus, a selective transmitting means for selectively transmitting reproduced signals from the plurality of reproducing apparatus, and a main control means for controlling the plurality of reproducing apparatus, the elevating and transporting means and the selective transmitting means, wherein it is possible to afford enough time necessary for exchangeably loading the tape cassette into the plurality of reproducing apparatus.

It is a further object of this invention to provide an apparatus for automatically supplying and selectively reproducing a tape cassette which comprises a bin apparatus having a plurality of racks, a plurality of reproducing apparatus, an elevating and transporting means for receiving and transporting a tape cassette between the bin apparatus and the plurality of reproducing apparatus, an automatic reading means provided in the elevating and transporting means and for automatically reading out an identifying data indicative of a recorded content of a tape cassette, a selective transmitting means for selectively transmitting reproduced signals from the plurality of reproducing apparatus, and a main control means for controlling the plurality of reproducing apparatus, the elevating and transporting means and the selective transmitting means and for latching therein the identifying data read out by the automatic reading means, wherein regardless of trouble of the elevating and transporting means, the playback and selective transmission of a reproduced signal from the tape cassette can be carried out by the reproducing apparatus.

It is a further object of this invention to provide an apparatus for automatically supplying and selectively reproducing a tape cassette which comprises a bin apparatus having a plurality of racks, a plurality of reproducing apparatus, an elevating and transporting means for receiving and transporting a tape cassette between the bin apparatus and the plurality of reproducing apparatus, a selective transmitting means for selectively transmitting reproduced signals from the plurality of reproducing apparatus, and a main control means for controlling the plurality of reproducing apparatus, the elevating and transporting means and the selective transmitting means, wherein even when a part of the plurality of reproducing apparatus becomes out of order or even when the playback and transmission data is urgently inserted or added to the playback and transmission list of the tape cassette, such requests can be satisfied promptly.

It is a still further object of this invention to provide an apparatus for automatically supplying and selectively reproducing a tape cassette which comprises a bin apparatus having a plurality of racks, a plurality of reproducing apparatus, an elevating and transporting means for receiving and transporting a tape cassette between the bin apparatus and the plurality of reproducing apparatus, a selective transmitting means for selectively transmitting reproduced signals from the plurality of reproducing apparatus, and a main control means for controlling the plurality of reproducing apparatus, the elevating and transporting means and the selective transmitting means, wherein modes of the plurality of reproducing apparatus can be changed over with ease.

It is a yet further object of this invention to provide a tape cassette playback and transmission list forming apparatus, wherein even when the number of the tape cassettes to be used is more than the number of racks of one bin apparatus of an apparatus for automatically supplying and selectively reproducing a tape cassette, the tape cassettes can efficiently and easily be distributed to a plurality of tape cassette automatic supplying apparatus.

According to an aspect of this invention, there is provided an apparatus for automatically supplying and selectively reproducing a tape cassette which comprises a bin apparatus having a plurality of racks, a plurality of reproducing apparatus, an elevating and transporting means for receiving and transporting a tape cassette between the bin apparatus and the plurality of reproducing apparatus, a selective transmitting means for selectively transmitting reproduced signals from the plurality of reproducing apparatus, and a main control means for controlling the plurality of reproducing apparatus, the elevating and transporting means and the selective transmitting means, in which the apparatus further includes detecting means for detecting a reproducing apparatus having a late playback start time from the plurality of reproducing apparatus and detecting means for detecting whether the reproducing apparatus detected by the detecting means is in the playback mode or not.

According to this invention, in this kind of apparatus for automatically supplying and selectively reproducing a tape cassette, playback and transmission data of the tape cassette can be inserted into a playback and transmission list of the tape cassette easily and positively.

According to another aspect of this invention, there is provided a tape cassette playback and transmission list forming apparatus which comprises memory means for storing therein data of an original playback and transmission list in which a plurality of tape cassette playback and transmission number and switching periods of reproducing apparatus are arranged in a time sequential order and the reproducing apparatus of different channels are designated sequentially on the plurality of the tape cassette playback and transmission numbers around the switching period, channel detecting means by which when a new switching period is inserted between the adjacent tape cassette playback and transmission numbers in the playback and transmission list stored in the memory means, one of the channels of the adjacent tape cassette playback and transmission numbers and the following other channel are detected, and channel converting means for converting a channel of a tape cassette playback and transmission number following the new switching period of the tape cassette playback and transmission number belonging to one channel into which the new switching period is inserted on the basis of the detected output of the channel detecting means to a channel different from one and other channels, wherein a channel changing result of the channel changing means is added to data of the original playback and transmission list.

According to this tape cassette playback and transmission list forming apparatus of the invention, when the new switching period is inserted between the adjacent tape cassette playback and transmission numbers on the playback and transmission list, the sequential order of the channels is not changed on the whole but changed partially, and it is possible to avoid such a defect that by the insertion of the new switching period, the existing switching period is erased that would otherwise make the generation of a special effect impossible.

According to a further aspect of this invention, there is provided an apparatus for automatically supplying and selectively reproducing a tape cassette which comprises a bin apparatus having a plurality of racks, a plurality of reproducing apparatus, an elevating and transporting means for receiving and transporting a tape cassette between the bin apparatus and the plurality of reproducing apparatus, a selective transmitting means for selectively transmitting reproduced signals from the plurality of reproducing apparatus, and a main control means for controlling the plurality of reproducing apparatus, the elevating and transporting means and the selective transmitting means, in which the apparatus further includes memory means for storing therein playback end times of tape cassettes respectively loaded onto the plurality of reproducing apparatus and playback start order determining means for determining the following playback start order of a plurality of VTRs on the basis of the stored contents of the memory means.

According to this invention, in the apparatus for automatically supplying and selectively reproducing a tape cassette, it is possible to afford enough time necessary for exchangeably loading the tape cassettes into the plurality of reproducing apparatus.

According to a further aspect of this invention, there is provided an apparatus for automatically supplying and selectively reproducing a tape cassette which comprises a bin apparatus having a plurality of racks, a plurality of reproducing apparatus, an elevating and transporting means for receiving and transporting a tape cassette between the bin apparatus and the plurality of reproducing apparatus, an automatic reading means provided in the elevating and transporting means and for reading out an identifying data indicative of a recorded content of a tape cassette, a selective transmitting means for selectively transmitting reproduced signals from the plurality of reproducing apparatus, and a main control means for controlling the plurality of reproducing apparatus, the elevating and transporting means and the selective transmitting means and for latching therein the identifying data read out by the automatic reading means, in which the apparatus further includes a manual reading means for manually reading out the identifying data and the identifying data read out by the manual reading means is latched in the main control means.

According to this invention, regardless of the trouble of the elevating and transporting means, the playback and selective transmission of a reproduced signal from the tape cassette by the reproducing apparatus can be carried out.

According to a further aspect of this invention, there is provided an apparatus for automatically supplying and selectively reproducing a tape cassette which comprises a bin apparatus having a plurality of racks, a plurality of reproducing apparatus, an elevating and transporting means for receiving and transporting a tape cassette between the bin apparatus and the plurality of reproducing apparatus, a selective transmitting means for selectively transmitting reproduced signals from the plurality of reproducing apparatus, and a main control means for controlling the plurality of reproducing apparatus, the elevating and transporting means and the selective transmitting means, in which the apparatus further includes a memory means for storing therein when a predetermined number of ones from the plurality of reproducing apparatus are designated as spare reproducing apparatus, and on the basis of the stored contents of the memory means, the remaining reproducing apparatus of the plurality of reproducing apparatus are used.

According to this kind of the apparatus for automatically supplying and selectively reproducing a tape cassette, even when part of the plurality of reproducing apparatus becomes out of order or even when the playback and transmission data is urgently inserted or added to the playback and transmission list of the tape cassette, such request can be satisfied promptly.

According to a still further aspect of this invention, there is provided an apparatus for automatically supplying and selectively reproducing a tape cassette which comprises a bin apparatus having a plurality of racks, a plurality of reproducing apparatus, an elevating and transporting means for receiving and transporting a tape cassette between the bin apparatus and the plurality of reproducing apparatus, a selective transmitting means for selectively transmitting reproduced signals from the plurality of reproducing apparatus, and a main control means for controlling the plurality of reproducing apparatus, the elevating and transporting means and the selective transmitting means, wherein the selective transmitting means is formed of a selecting means for selecting the reproduced outputs of the plurality of reproducing apparatus so as to produce signals of a plurality of channels and a switching means for changing over the signals of a plurality of channels from said selecting means and there is further provided a controller for changing over the modes of a plurality of reproducing apparatus at every plurality of channels.

According to this aspect of the invention, the modes of the plurality of reproducing apparatus can be changed over with ease.

According to a yet further object of this invention, there is provided a tape cassette playback and transmission list forming apparatus which comprises a calculating means supplied with a data of list in which a plurality of tape cassette playback and transmission numbers and blank periods during which no playback and transmission of tape cassette are carried out are arranged in a time sequential order and for dividing by using the blank period as the boundary the tape cassette playback and transmission number into a plurality of blocks such that the number of tape cassettes becomes close to the number of racks of a bin apparatus of the tape cassette supplying and reproducing apparatus as much as possible and at every number less than the number of the above-described racks and designating means for designating which of the plurality of the tape cassette playback and transmission numbers belong to the plurality of the tape cassette automatic supplying and selecting reproducing apparatus on the basis of the calculated results of the calculating means, wherein the designated results of the designating means are added to the data of the original playback and transmission data.

According to the tape cassette playback and transmission list forming apparatus of this invention, even when the number of the tape cassettes to be used is beyond the number of racks of the bin apparatus of a single tape cassette automatic supplying and selecting reproducing apparatus, the tape cassettes can efficiently and easily be distributed to the plurality of apparatus for automatically supplying a tape cassette.

These and other objects, features and advantages of the present invention will become apparent from the following detailed description of the preferred embodiment taken in conjunction with the accompanying drawings, throughout which like reference numerals designate like elements and parts.

BRIEF DESCRIPTION OF THE DRAWINGS

FIG. 10 is a flow chart useful for explaining the function block of FIG. 9;

FIG. 11 is a block diagram showing other function of the microcomputer used in the apparatus of FIG. 1;

FIG. 17 is a block diagram showing other function of the microcomputer used in the apparatus of this invention shown in FIG. 1;

FIG. 18 is a flow chart useful for explaining the function block of FIG. 17;

FIG. 19 is a diagram illustrating an example of an auxiliary bar code reader used in this invention; and FIGS. 20A, 20B and 20C are respectively pattern diagrams of a transmission list displayed on a picture screen of a monitor television receiver useful for explaining the operation of the auxiliary bar code reader shown in FIG. 19.

DESCRIPTION OF THE PREFERRED EMBODIMENT

Figures 1, 2:
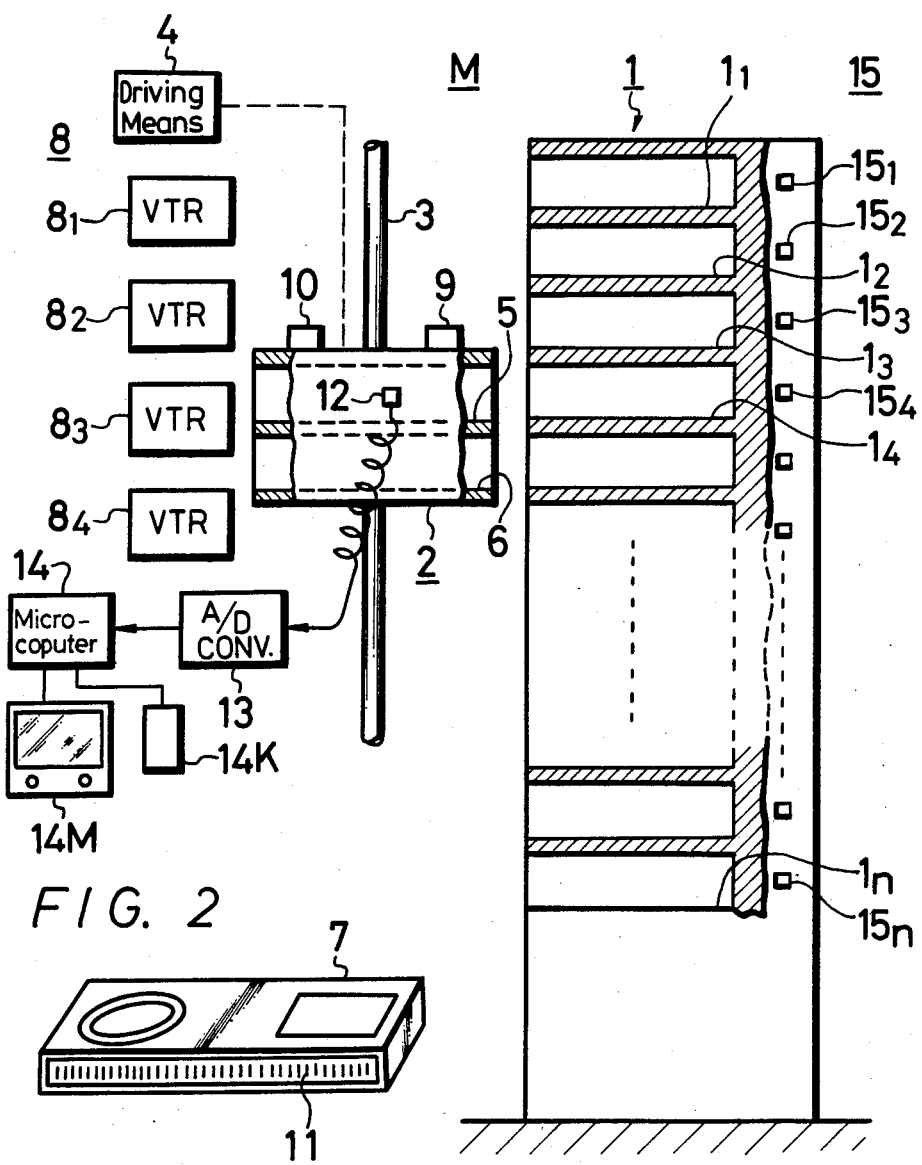
FIG. 1 is a diagram showing an embodiment of an apparatus for automatically supplying and selectively reproducing a tape cassette according to this invention.
FIG. 2 is a perspective view illustrating an example of the tape cassette used in the apparatus of this invention shown in FIG. 1.

Now, an embodiment of the apparatus according to this invention will hereinafter be described in detail with reference to the attached drawings. FIG. 1 schematically shows an overall arrangement of an apparatus M for automatically supplying and selectively reproducing a tape cassette (hereinafter simply referred to as the apparatus M). Referring to FIG. 1, a single apparatus M will be described. However, in practical use, in addition to the use of the single apparatus M, a plurality of the apparatus M of the same arrangement can be used which are controlled by a common microcomputer which will be described later and which are used selectively or exchangeably.

In FIG. 1, reference numeral 1 generally designates a bin apparatus and reference numerals $1_1$ to $1_n$ respectively designate a plurality of racks thereof, for example, 40 racks. Reference numeral 2 designates an elevator which is used as an elevating and transporting means. The elevator 2 is driven by an elevating and driving means 4 so as to move upward or downward along a guide 3. The elevator 2 is provided with two racks 5 and 6. The upper rack 5 is adapted to receive a tape cassette 7 (FIG. 2) from each of the racks $1_1$ to $1_n$ and to return it to an original rack or to supply it to, for example, one of four VTRs (video tape recorders) 8 ($8_1$ to $8_4$), while the lower rack 6 is adapted to return the tape cassette 7 supplied from the VTR 8 to any one of the racks $1_1$ to $1_n$. Reference numerals 9 and 10 designate motors for driving actuators (not shown) which move the tape cassettes 7 set on the upper and lower racks 5 and 6 of the elevator 2, respectively.

Reference numeral 12 designates a photo detector which is provided on the upper rack 5 and used as a detecting means for detecting a bar code 11 that is attached to the tape cassette 7 on, for example, the rear surface thereof, and indicates an identifying data relating to the recorded contents of the tape as shown in FIG. 2. A detected signal from the photo detector 12 is supplied through an A/D (analog-to-digital) converter 13 to a CPU (central processing unit) or microcomputer 14. Reference numerals 14M and 14K respectively designate a monitor television receiver and an auxiliary controller which can be a wire or wireless remote controller, each of which is connected to the microcomputer 14.

An indicator 15 (indicators $15_1$ to $15_n$) such as an LED (light emission diode) and so on is attached to each side surface of the racks $1_1$ to $1_n$. This indicator 15 is connected to the microcomputer 14, wherein when the bar code 11 of the tape cassette 7 accommodated in the rack is read out correctly, the corresponding indicator is blinked.

Figure 3:
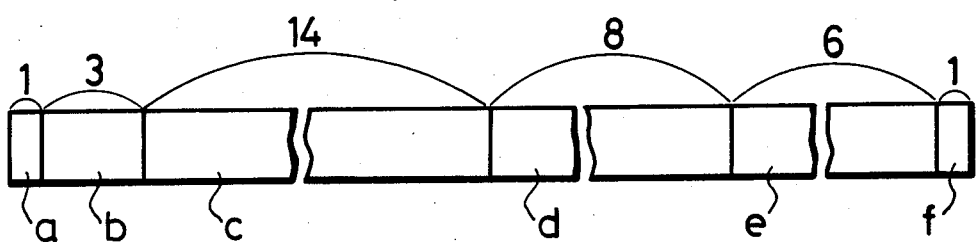
FIG. 3 is a pattern diagram showing an example of a format of a bar code attached to the tape cassette of FIG. 2.
Figure 4A:
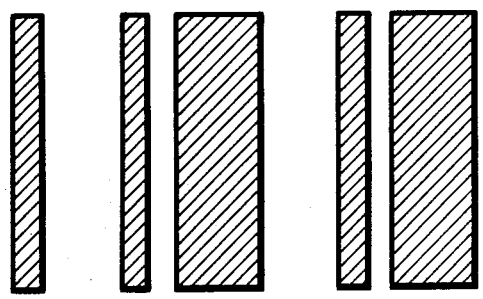
FIGS. 4A, 4B and 4C are respectively a diagram showing an example of a pattern of a bar code of one character attached to the tape cassette of FIG. 2, a waveform diagram showing a wave form of a read signal thereof and a waveform diagram useful for explaining the reading operation of the bar code pattern.
Figure 4B:

The data of the identifying data represented by the bar code 11 attached to the rear surface of the tape cassette 7 is formed of, as shown in FIG. 3, a mode identifying number a indicative of the use of the tape cassette of first one character amount, a transmission number (story number) b of 3 character amount, a title c of 14 character amount indicative of the recorded contents of the tape, a tape playback start time (hour, minute, second and frame (1/30 seconds)) d of 8 character amount, a tape playback time (hour, minute, second and frame) e of 6 character amount and a check sum f of one character amount. As a bar code pattern of one character amount, there are known various kinds of bar code patterns, and in this embodiment, an interleave system of so-called 2 of 5 is employed as, for example, shown in FIG. 4A. That is, the bar code of one character is formed of three black bars each having a width of one unit and two black bars each having a width of three units, so that the number of the widths of the black bars totals nine units. Further, the bar code is formed of the spacings or distances of the bars. Also, the bar code of another one character is formed of three white bars each having a width one and two white bars each having a width three.

Figure 4C:
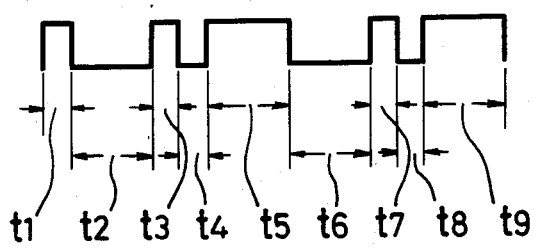

Next, a way of how to read the bar code 11 will be described and in this case, it is considered to detect the bar code formed of, for example, the black bars. The bar code detecting signal detected by the detecting means 12 shown in FIG. 1 becomes a sine wave of which the cycle is changed in accordance with the widths of the black bars. If this sine wave signal is waveform-shaped, it is possible to obtain an identifying data signal having a duration of time corresponding to each of the black bars as shown in FIG. 4C. The pulse widths of the first to fifth black bars are respectively represented as $t_1$, $t_3$, $t_5$, $t_7$ and $t_9$, while the pulse widths of data indicated by the white bars interposed between the black bars are represented as $t_2$, $t_4$, $t_6$ and $t_8$. Accordingly, when the bar code signal of one character is reproduced, the pulse widths $t_1$, $t_3$, $t_5$, $t_7$ and $t_9$ are totalized and then divided by 9. On the other hand, the resultant value is multiplied with 1.5 to thereby obtain a threshold value. Then, by comparing the data pulse width with these corresponding to each black bar, the difference of the widths of the black bars forming the bar code 11 is detected and thus the bar code of one character is read. It is needless to say that the bar code formed of the white bars is read in like manner.

Figure 5:
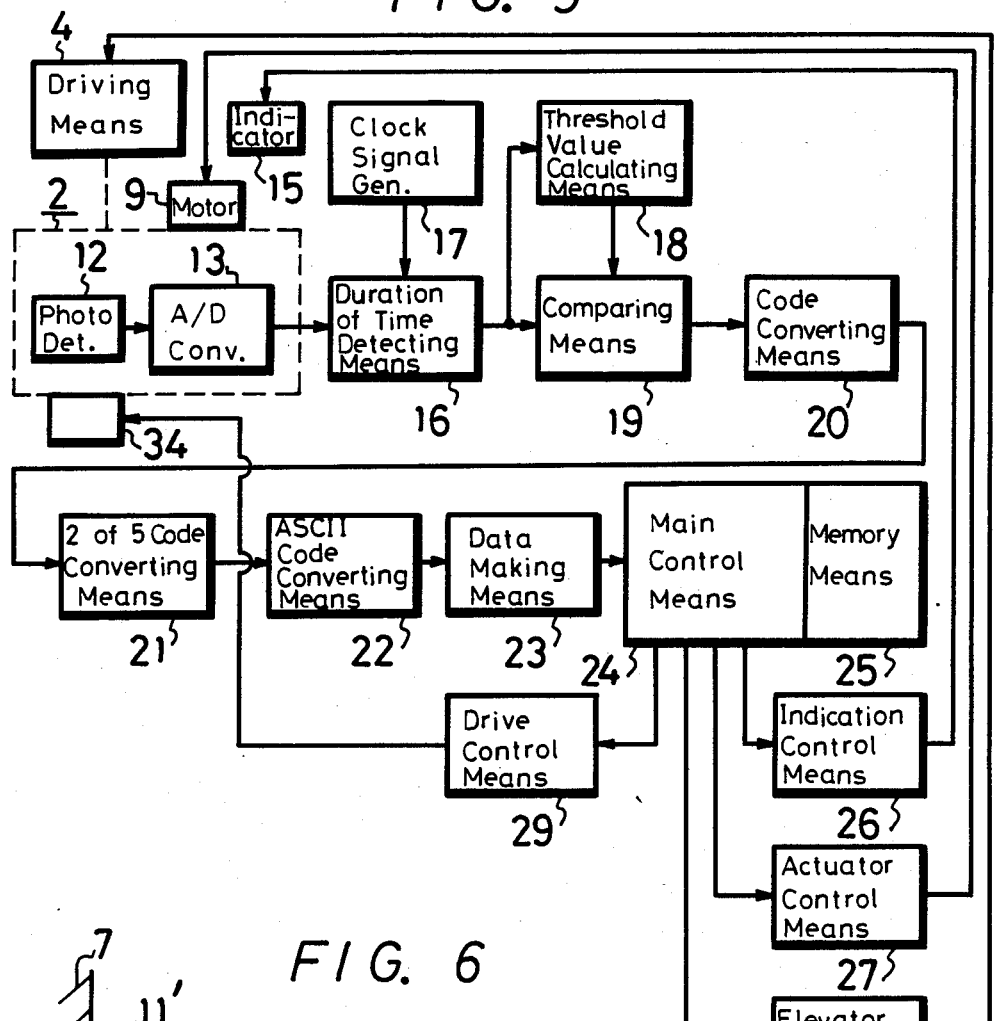
FIG. 5 is a block diagram showing one function of a microcomputer used in the apparatus of this invention shown in FIG. 1.

First, into the racks $1_1$ to $1_n$, there are transported manually one or a plurality of tape cassettes 7 (less than n tape cassettes) necessary for the broadcasting time of a certain unit. Then, the bar codes 11 of all the tape cassettes 7 accommodated in the racks are read out and then the identifying data on the bar codes 11 are stored in the microcomputer 14. This operation will be described more fully with reference to FIG. 5. FIG. 5 is a function block of the microcomputer 14 used to read the bar code 11.

Referring to FIG. 5, the elevator 2 is provided with the above-mentioned photo detecting means 12 and A/D converter 13 and the detected output from the detecting means 12 is supplied to the A/D converter 13 in which it is digitized. The digitized detecting signal from the A/D converter 13 is supplied to a time axis or duration, of time detecting means 16 in which it is counted by a high frequency clock signal from a clock signal generator 17, thus the, duration of time of each bar of the bar code is detected. Then, its above-described threshold value is calculated in a threshold calculating means 18. The output from the duration of time detecting means 16 is also supplied to a comparing means 19 in which it is compared with the threshold value supplied from the threshold value calculating means 18 and thus a data based on the width of the black bar (or white bar) is detected. The output of the comparing means 19 is supplied to a duration of time small and large codes converting means 20 and the output therefrom is supplied to a 2 of 5 code converting means 21. The output from the 2 of 5 converting means 21 is further supplied to an ASCII (American national standard code for information interchange) code converting means 22 whose output is fed to a data making means 23. The bar code data obtained from the data making means 23 is supplied to a main control means 24 and this main control means 24 includes a memory means 25.

From the main control means 24, control signals are respectively supplied to an indication control means 26 for controlling the indication of the indicator 15, an actuator control means 27 for controlling the actuator (not shown) which moves the tape cassette 7 disposed on the upper rack 5 of the elevator 2, an elevator control means 28 for controlling the movement of the elevator 2 via the elevating and driving means 4 and a drive control means 29 for the detecting means 12. This drive control means 29 controls a driving means (plunger) 34 of the detecting means 12 so as to vary the angle of the detecting means 12 relative to the bar code being read.

The indication control means 26 controls the indicator 15 (indicators $15_1$ to $15_n$) such that when the tape cassette 7 is being moved reciprocally on the upper rack 5 of the elevator 2, if the bar code 11 of the tape cassette 7 is positively read out, the indicator 15 (indicators $15_1$ to $15_n$) is blinked. The actuator control means 27 is adapted to control the motor 9 which drives the actuator on the upper rack 5 of the elevator 2.

Figure 6:
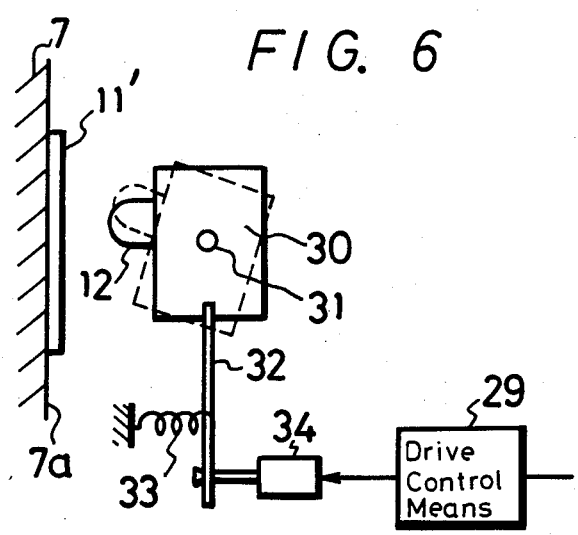
FIG. 6 is a diagram showing an example of a photo detecting means for reading the bar code used in the apparatus of this invention shown in FIG. 1.

FIG. 6 illustrates an example of a drive means for driving the detecting means 12. According to this drive means, when the bar code 11 of the tape cassette 7 is detected reciprocally by the detecting means 12, if the bar code 11 is not detected correctly, the angle of the detecting means 12 is varied to thereby vary the detecting position in the width direction of the bar code 11. In FIG. 6, reference numeral 7a designates the back surface of the cassette housing of the tape cassette 7 and reference numeral 11' a label which is pasted to the back surface 7a of the tape cassette 7. The detecting means 12 is mounted on a support member 30 and is rotatable freely around a central shaft 31 of the support member 30. A lever 32 is extended from the support member 30 and is biased by the spring force of a coil spring 33 so as to be rotatable in the clockwise direction. Reference numeral 34, on the other hand, designates a plunger and under normal condition, the plunger 34 is not excited. Under the state that the plunger 34 is not excited, the lever 32 is biased by the spring force of the coil spring 33 to thereby place the detecting means 12 at the position shown by a broken line in FIG. 6. When, on the other hand, the plunger 34 is excited by the control output from the control means 29, the operator of the plunger 34 is moved in the right-hand direction in FIG. 6 so that the lever 32 is rotated in the counterclockwise direction against the spring force of the coil spring 33, thus the detecting means 12 being placed at the position shown by a solid line in FIG. 6. Consequently, at the different positions in the width direction of the bar code 11, it becomes possible to detect the bar code 11.

Figure 7:
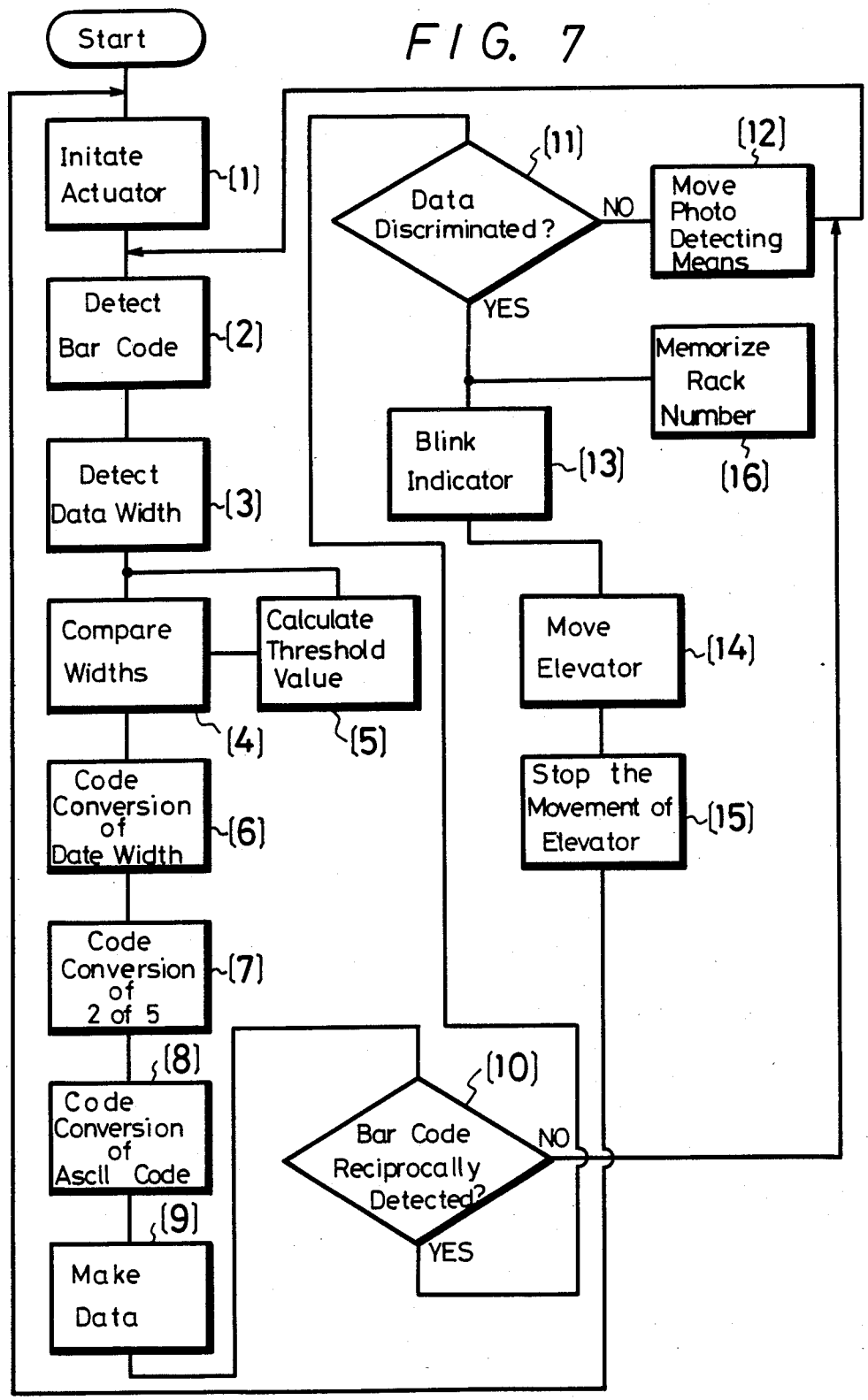
FIG. 7 is a flow chart useful for explaining the function block of FIG. 5.

The function of the microcomputer 14 shown in the function block of FIG. 5 will be described with reference to a flow chart of FIG. 7.

At first, as shown in FIG. 1, the elevator 2 is located at such a position that the upper rack 5 thereof is able to receive the tape cassette which is accommodated in, for example, the rack $1_4$ of the bin apparatus 1. When the motor 9 is controlled by the control means 27 and then in step 1 the actuator (not shown) is driven, the tape cassette 7 (not shown) accommodated in the rack $1_4$ is transported to the upper rack 5 of the elevator 2. At this time, the bar code 11 is read out by the bar code detecting means 12 in step 2. The detected output from the bar code detecting means 12, or the digitized detecting output from the A/D converter 13 is supplied to the data width detecting means 16 which then detects the data width thereof in step 3. The detected output from the detecting means 16 is supplied to the width comparing means 19 in which it is compared (step 4) with the threshold value calculated by the threshold value calculating means 18 (step 5). Then, the compared output from the width comparing means 19 is supplied through the data width code converting means 20 (step 6), the 2 of 5 code converting means 21 (step 7) and the ASCII code converting means 22 (step 8) to the data making means 23 (step 9) which then makes the bar code data. When the actuator is driven to thereby return the tape cassette 7 from the upper rack 5 of the elevator 2 to the original rack $1_4$, the bar code 11 is read out once again and the signal processing is carried out similarly to the above-described one. Further, in step 10, the main control means 24 judges whether the bar code 11 is read out reciprocally. If the bar code 11 is read out reciprocally, the processing step proceeds to step 11. In step 11, it is judged whether the bar code data is read out positively by reading the bar code data reciprocally or not.

If the bar code data is not correctly read out, as shown in FIG. 6, in step 12, by controlling the drive control means 29 of the detecting means 12, the angle of the detecting means 12 is varied and the tape cassette 7 is once again transported from the rack $1_4$ to the upper rack 5 of the elevator 2 and returned to the original rack $1_4$ so that the bar code 11 is read out reciprocally at different positions in the width direction of the bar code 11 similarly as above.

If it is judged that the bar code is read as the correct data, the indicator $15_4$ corresponding to the rack $1_4$ in which the tape cassette 7 is accommodated is blinked (in step 13) and by controlling the elevator control driving means 4 so as to start the elevator 2 to move, the elevator 2 is moved upward or downward (step 14) and the elevator 2 is halted at the adjacent rack (step 15). Then, the similar operation as described above is carried out.

If the bar code data is correctly read out from the bar code 11, the rack number of the corresponding tape cassette and the contents of the bar code 11 of the tape cassette 7 are stored in the memory means 25 in step 16 and then they are displayed on the picture screen of the monitor television receiver 14M. If these operations are repeatedly carried out, the identifying data relating to the recorded contents of all the tape cassettes 7 accommodated in the racks $1_1$ to $1_n$ can be read out, stored in the memory means 25 together with the rack numbers and then displayed on the picture screen of the monitor television receiver 14M.

Next, a selecting and transmitting means 40 of the reproduced video signals from the VTRs 8₁ to 8₄ in the apparatus M shown in FIG. 1 will be described with reference to FIG. 8.

Figure 8:
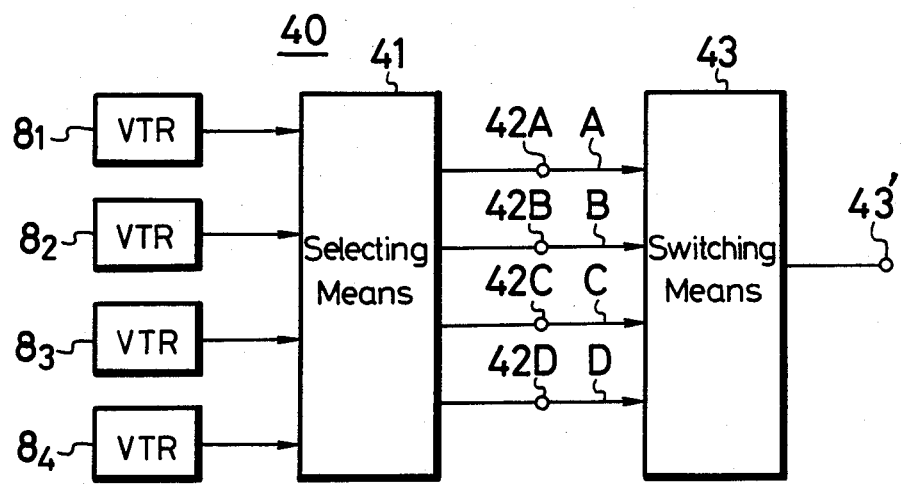
FIG. 8 is a block diagram showing an example of a selective transmitting means used in the apparatus of FIG. 1.

Referring to FIG. 8, the reproduced video signals from the VTRs 8₁ to 8₄ are respectively selected by a selecting means 41 (controlled by the microcomputer 14 in FIG. 1) and then fed to any ones of output terminals 42A to 42D, separately. The video signals of the channels A to D from the output terminals 42A to 42D are selectively changed over by a switching means 43 (incorporating therein a special effect generating apparatus) that is controlled by the microcomputer 14 of FIG. 1 and the reproduced video signal from the selected single VTR is delivered to an output terminal 43', which then is fed to a broadcasting apparatus (not shown).

Subsequently, a way of how to select and to transmit the reproduced video signal of the VTR will be described. At first, a transmission list is made. This transmission list may be made by using the microcomputer 14 in FIG. 1 or made independently. This list is printed on a paper. This list is stored in the memory means 25 of the microcomputer 14 (FIG. 1) and then read out therefrom, thereby displayed on the picture screen of the monitor television receiver 14M (FIG. 1).

As the items on this transmission list, there are prepared, for example, ① transmission number, ② mode identifying number, ③ title, ④ tape playback start time (hour, minute and second), ⑤ tape playback time (hour, minute and second), ⑥ tape playback integrating time (hour, minute and second), ⑦ tape cassette automatic supplying and selecting apparatus (shown by the apparatus number and in the case of the single apparatus, this item ⑦ can be omitted), ⑧ rack (the rack numbers corresponding to the racks 1₁ to 1ₙ), ⑨ channel (any one of the channels A to D), ⑩ VTR (any one of the numbers①to④corresponding to the VTRs 8₁to 8₄) and so on. The sequential order of these items ① to ⑩ can be changed as desired.

Of the items ① to ⑩ on the transmission list, in the beginning, the parts of, for example, the items ① to ⑥ (a part of the other items except the item ① can be omitted) are filled with data and other parts of these items are filled with data read out from the bar code 11 attached to the rear surface of the tape cassette 7 and data obtained by considering data of other items.

Of the items ① to ⑩ on the transmission list, at the beginning, the part of the item ① is filled with data and other parts of other items can be filled with data read out from the bar code 11 of the tape cassette 7 and data obtained by considering the data of other items.

Between the transmission numbers as mentioned above, there may be prepared a blank period which is used to reproduce and transmit the pictures such as a picture of an object in the broadcasting studio (for example, announcer, appearance of the cast, diagram panel and so on), a picture of the on-the-spot telecast (hookup) and so on. This blank period is indicated as, for example, "BREAK" or "BK" in the part of the transmission number of, for example, the item ① and the content (title) is displayed on the part of the title in the item ③. If the blank period is inserted between the transmission numbers, the video channel is changed at each time of insertion sequentially and the VTR is selectively changed over in conjunction therewith. Thus, by inserting the blank period (the switching period) having zero time or a short time, it becomes possible to achieve special effects such as fade-in, fade-out and so on. In this case, the duration of time of this blank period is contained in the tape playback integrating time.

For example, when this apparatus M is used to broadcast news, news show, commercial and the like in a certain period of time, if the number of the required tape cassettes 7 exceeds the number of the racks 1₁ to 1ₙ of the single apparatus M, a plurality of apparatus M₁ to Mₖ must be used and the tape cassettes 7 must be distributed to them, respectively.

Figure 9:
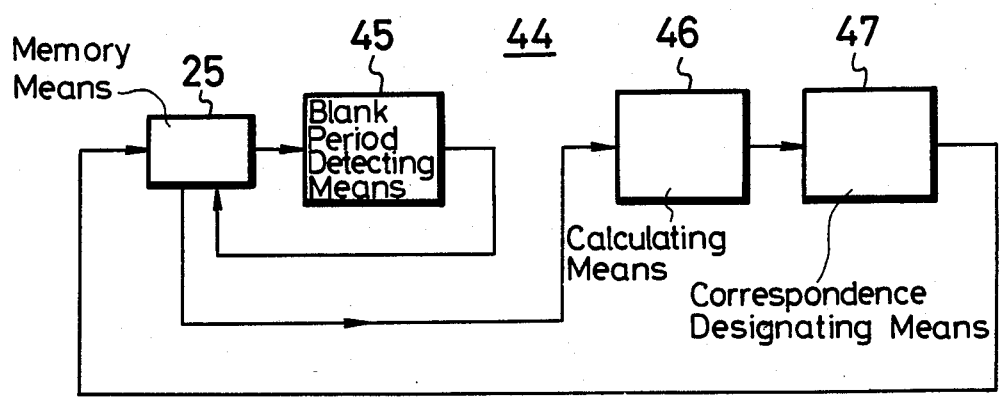
FIG. 9 is a block diagram illustrating other function of the microcomputer used in the apparatus of FIG. 1.

Subsequently, a way of how to distribute the tape cassettes 7 by using the microcomputer 14 (FIG. 1) will be described in detail with reference to a function block of FIG. 9 and a flow chart of FIG. 10. In FIG. 9, reference numeral 44 generally designates an overall arrangement of a distributing means for the tape cassettes 7. That is, as shown in FIG. 9, data regarding the transmission number and the blank period is read out from the memory means 25 in step 20 and supplied to a blank period position detecting means 45 in step 21, whereby a data of the transmission number just before the blank period is stored in the memory means 25. Then, the data indicative of the blank period position stored in the memory means 25 is supplied to a tape cassette number calculating means 46 in which the transmission number is divided at every number as close to n as possible within n (for example, n is 40) in a proper blank period to thereby form the blocks of the transmission number, or the blocks (groups) of the tape cassettes 7 (step 22). Then, in step 23, the data resulting from the calculation results of the calculating means 46 is supplied to a correspondence designating means 47 which designates the corresponding relation between the transmission numbers and the apparatus M₁ to Mₖ. Then, the data indicative of the designated result is stored in the memory means 25 and the part of the apparatus M in the item ⑦ on the picture screen of the monitor television receiver 14M is filled with such data indicative of the designated results.

For example, when the spot commercial is broadcast, let it be assumed that there are transmission numbers 1 to 140. Also let it be assumed that the blank periods be provided between the transmission numbers 35 and 36, 66 and 67, 77 and 78, 90 and 91 and 112 and 113, respectively. Then, 35 transmission numbers from 1 to 35, 31 transmission numbers from 36 to 66, 24 transmission numbers from 67 to 90, 22 transmission numbers from 91 to 112 and 28 transmission numbers from 113 to 140 constitute first to fifth transmission number blocks, or the blocks (groups) of the tape cassettes 7.

When the apparatus M is used, for example, two (may be more than three) apparatus M₁ and M₂ are used alternately (three apparatus or above can be used cyclically) to thereby exchange the tape cassettes 7 disposed on the racks 1₁ to 1ₙ of the apparatus which is in its non-use mode.

Accordingly, when the number of the tape cassettes 7 is larger than the number n of the racks 1₁ to 1ₙ of the single apparatus M, the tape cassettes 7 can be distributed to the plurality of the apparatus M₁ to Mₖ efficiently and easily.

Since the identifying data of the tape cassettes 7 read out from the bar codes 11 thereof accommodated in the racks 1₁ to 1ₙ of the single or the plurality of the apparatus M are stored in the memory means 25 and each time the tape cassettes 7 accommodated in the racks 1₁ to 1ₙ are exchanged, the identifying data stored in the memory means 25 are updated, the blanks of the respective items of the transmission list are filled with the updated data or corrected and then displayed on the picture screen of the monitor television receiver 14M.

By way of example, the following explanation will be given to the single apparatus M shown in FIG. 1 for simplicity. The following table illustrates a simple example (upon broadcasting news) of the above-described transmission list (displayed on the picture screen of the monitor television receiver 14M).

TABLE 1

| transmission number | mode identifying number | title | tape playback start time | tape playback time | tape playback integrating time | tape cassette supplying apparatus | rack | channel | VTR |
|---|---|---|---|---|---|---|---|---|---|
| 1 | N2 | OOXX | 07:00:00 | 00:00:30 | 00 00:30 | 1 | 3 | A | 1 |
| 2 | N2 | XXOO | 07:00:30 | 00:00:45 | 00:01:15 | 1 | 4 | A | 2 |
| 3 | N2 | OOXO | 07:01:15 | 00:00:20 | 00:01:35 | 1 | 5 | A | 3 |
| BK | | XOXO | 07:01:35 | 00:00:45 | 00:02:20 | | | | |
| 4 | N2 | XXXO | 07:02:20 | 00:01:05 | 00:03:25 | 1 | 6 | B | 4 |
| 5 | N2 | OXXO | 07:03:25 | 00:00:45 | 00:04:10 | 1 | 8 | B | 1 |
| 6 | N2 | OOOO | 07:04:10 | 00:01:20 | 00:05:30 | 1 | 10 | B | 2 |
| BK | | OXXO | 07:05:30 | 00:00:35 | 00:06:05 | | | | |
| 7 | N2 | XXXX | 07:06:05 | 00:01:05 | 00:07:10 | 1 | 1 | C | 3 |
| BK | | OOXX | 07:07:10 | 00:00:55 | 00:08:05 | | | | |
| 8 | N2 | XOXO | 07:08:05 | 00:00:50 | 00:08:55 | 1 | 12 | D | 4 |
| BK | | XOXO | 07:08:55 | 00:01:25 | 00:10:20 | | | | |
| 9 | N2 | OOXO | 07:10:20 | 00:01:30 | 00:11:50 | 1 | 13 | A | 1 |
| 10 | N2 | XXOO | 07:11:50 | 00:02:05 | 00:13:55 | 1 | 15 | A | 2 |
| BK | | OOOO | 07:13:55 | 00:00:35 | 00:14:30 | | | | |
| 11 | N2 | OOXX | 07:14:30 | 00:00:30 | 00:15:00 | 1 | 18 | B | 3 |

The contents on the TABLE 1 will be described. Each time the blank period is inserted between the transmission numbers, the channels are sequentially changed over as cyclically in A→B→C→D→A. Each time the transmission number is changed, the VTR is changed over into a different one but in this case, there is no corresponding relation between the numbers 1 to 4 of the VTRs and the channels A to D. However, when the channel is changed over, the VTR is changed over too. Although the data of time or period presents hour, minute, second and frame in practice, the frame is omitted for simplicity.

The transmission number is not in the sequential order and the number may be skipped and so on or the sequential order of the number may be reversed by the insertion of the transmission number. In some case, video signals reproduced from tape cassettes of different transmission numbers belonging to different channels are simultaneously reproduced by the different VTRs and then the reproduced video signal of single channel is selected and transmitted by the switching means 43 (FIG. 8). Further in some case, the video signals of the tape cassettes of the transmission numbers adjacent to each other are reproduced under being partially overlapped upon transition and then faded-in or faded-out, for example, by the special effect generating apparatus (not shown) provided in the switching means 43.

The apparatus M of FIG. 1 is provided with four VTRs 8₁ to 8₄, in which as shown on the above-mentioned TABLE 1, the four VTRs 8₁ to 8₄ are all used. In this case, if one VTR is used as a spare VTR and remaining three VTRs are used usually, when any one of the remaining three VTRs becomes out of order or the transmission number is interrupted (or inserted), the spare VTR can be used.

More particularly, the VTRs 8₁ to 8₄ in FIG. 1 are controlled by the main control means 24 (FIG. 5) of the microcomputer 14 as shown in FIG. 11. For example, when the VTR 8₄ is designated as a spare VTR, the remaining three VTRs 8₁ to 8₃ are ordinary-use VTRs and the fact that the VTR 8₄ becomes the spare VTR is stored in a memory means (non-volatile memory means such as a semiconductor memory, floppy or flexible disk and so on) 50. In this case, the memory means 25 may be usable for storing the above fact. If of the ordinary-use VTRs 8₁ to 8₃, the VTR 8₃, for example, becomes out of order, the VTR 8₃ is replaced with the spare VTR 8₄ by the control of the main control means 24 and this VTR exchanged state is stored in the memory means 50 (the memory means 25 is also usable). Further, if the transmission number is interrupted (or inserted), the spare VTR 8₄ is used as the ordinary-use VTR temporarily or continuously and this state is stored in the memory means 50 (the memory means 25 is usable, too). If the VTRs 8₁ to 8₄ are all used as the ordinary-use VTRs, this state is stored in the memory means 50 (the memory means 25 is also possible).

Then, the memorized contents of the memory means 50 (the memory means 25), or the using states of the VTRs 8₁ to 8₄ are stored in the memory means 25 (FIG. 5) and on the basis of the contents stored in the memory means 25, the part of the item concerning the VTR on the above-described transmission list is filled with data of such contents or corrected.

Accordingly, even if a certain VTR of the plurality of VTRs becomes out of order, such useless VTR can be replaced with the spare VTR promptly so that the transmission of the reproduced video signal from the VTR is never ceased.

Further, even when the transmission number is interrupted or added to the transmission list, or the transmission list itself is changed, the changed tape cassette can be reproduced rapidly by the VTR.

A way of how to decide the sequential order of the VTRs in use will be described. When on the basis of the above-mentioned transmission list the tape cassette 7 loaded onto a certain VTR of the VTRs 8₁ to 8₄ is ended, the tape cassette 7 is transported by the elevator 2 and then returned to the original rack of the racks 1₁ to 1ₙ, while the tape cassette 7 accommodated in other rack is transported by the elevator 2 and then once again loaded onto the afore-said VTR. If this operation is carried out repeatedly, on the basis of the transmission list, the tape cassettes 7 accommodated in the rack 1₁ to 1ₙ are sequentially loaded onto the VTRs 8₁ to 8₄ and then reproduced, respectively.

In this case, of the VTRs $8_1$ to $8_4$, the VTR having an earlier playback start time has a higher priority order. Then, the sequential order of the VTRs upon use is determined by the calculation of the microcomputer 14 (FIG. 1) such that the VTR having an earlier playback end time has a lower priority order. If one of the VTRs $8_1$ to $8_4$ is determined as the spare VTR, the sequential order of the remaining VTRs upon use is determined similarly as described above.

This operation will be described more fully with reference to a function block of FIG. 12, a flow chart of FIG. 13 and the following TABLE 2.

TABLE 2

| transmission number | VTR | playback start time | playback end time |
|---|---|---|---|
| 1 | 3 | 10:05:20 | 10:07:06 |
| 2 | 1 | 10:06:03 | 10:06:53 |
| 3 | 4 | 10:06:10 | 10:06:50 |
| 4 | 2 | 10:06:50 | 10:07:30 |
| 5 | 4 | 10:07:10 | 10:07:55 |
| 6 | 1 | 10:07:25 | 10:07:50 |
| 7 | 3 | 10:07:50 | 10:08:50 |
| 8 | 2 | 10:08:05 | 10:08:45 |
| 9 | 1 | 10:08:45 | 10:09:35 |
| 10 | 4 | 10:08:50 | 10:09:20 |
| 11 | 2 | 10:09:05 | 10:09:55 |
| 12 | 3 | 10:09:54 | 10:10:35 |

Figure 12:
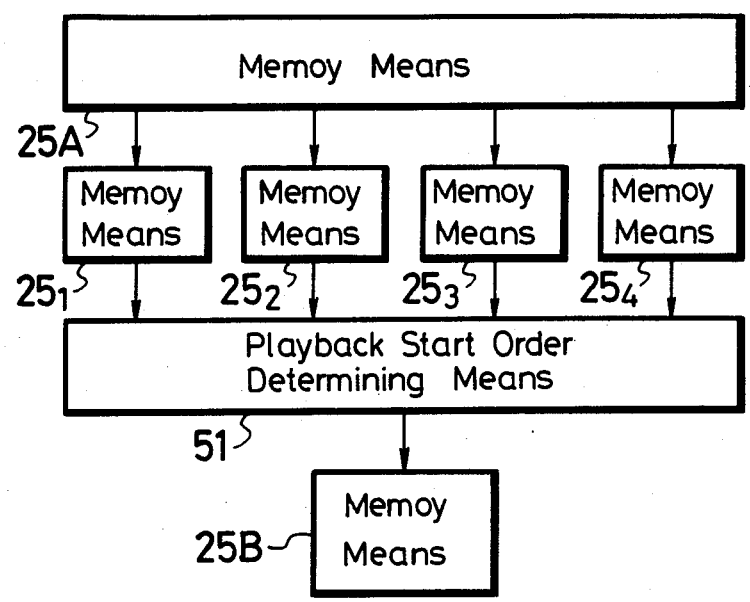
FIG. 12 is a like function block diagram of the microcomputer used in the apparatus of this invention shown in FIG. 1.
Figure 13:
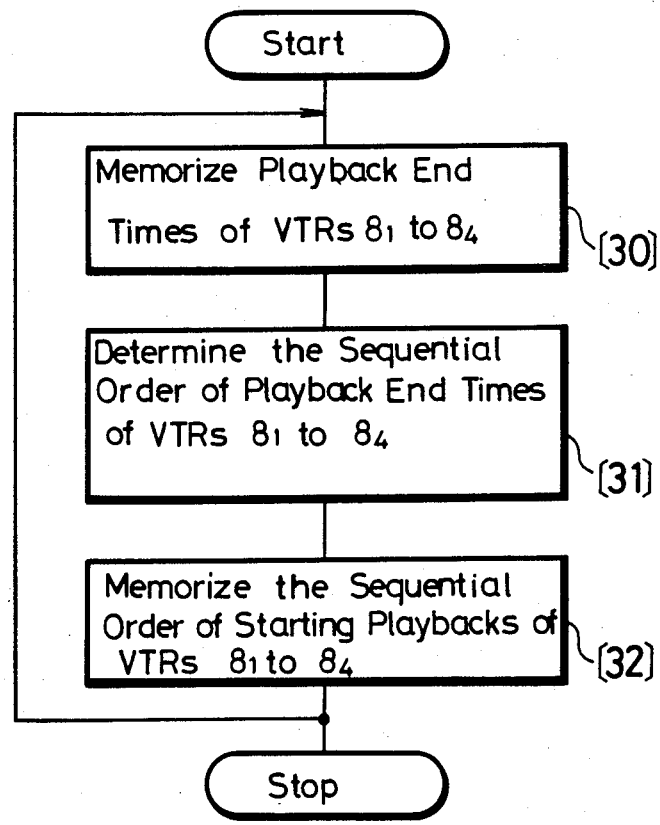
FIG. 13 is a flow chart useful for explaining the function block of FIG. 12.

In FIG. 12, reference numerals 25A, 25B and $25_1$ to $25_4$ respectively designate some memory areas of the memory means 25 of FIG. 5 and they are each referred to as the memory means, too. In the memory means 25A, there are stored the playback start time data and the playback end time data of the tape cassette of each transmission number based on such list as, for example, shown on the TABLE 2. The memory means $25_1$ to $25_4$ store therein the playback end times of the VTRs $8_1$ to $8_4$ (the numbers 1 to 4), respectively in step 30. The data indicative of the playback end time read out from the memory means $25_1$ to $25_4$ are supplied to a playback start order determining means 51 of the VTRs $8_1$ to $8_4$ by which as shown on the TABLE 2 the VTRs having an earlier playback end time have a lower priority order in step 31. Thus, the playback start order data of the VTRs $8_1$ to $8_4$ are stored in the memory means 25B (step 32), whereby to fill the part of the VTR of the item ⑩ on the transmission list. If the transmission number is inserted or changed, the above operation is carried out once again.

Accordingly, it is possible to afford enough time necessary for the exchange and/or loading of the tape cassettes 7 in the VTRs $8_1$ to $8_4$.

The auxiliary control apparatus 14K of FIG. 1 will be described with reference to FIG. 14.

Figure 14:
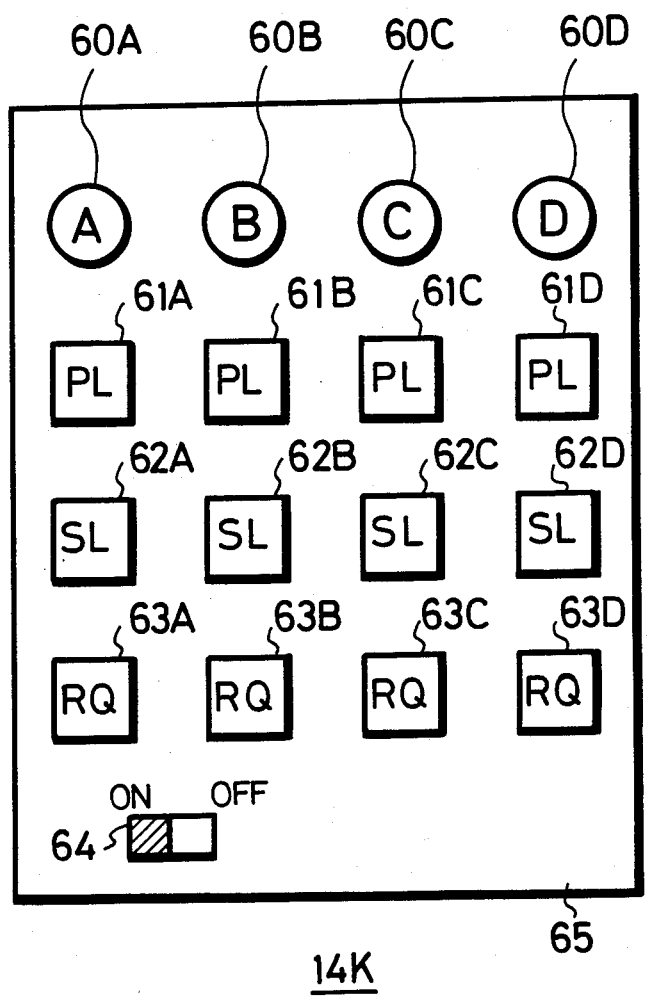
FIG. 14 is a plan view illustrating an example of an auxiliary control apparatus used in the microcomputer of the apparatus of this invention shown in FIG. 1.

In FIG. 14, reference numerals 60A to 60D respectively designate indication marks corresponding to the channels A to D, reference numerals 61A to 61D respectively designate normal playback mode control operators (operator buttons) for the VTRs corresponding to the channels A to D, reference numerals 62A to 62D respectively designate still picture playback mode control operators (operation buttons) for the VTRs corresponding to the channels A to D, reference numerals 63A to 63D respectively designate control operators (operation buttons) for returning the VTRs corresponding to the channels A to D into the playback standby mode and reference numeral 64 designates an operator (slide switch) of the power switch. The above operators are all disposed on a panel 65.

The operation of the auxiliary control apparatus 14K will be described. When the power operator or switch 64 is turned on, if any one of the operators 61A to 63D (each also serving as an indication element) is operated, by the control of the control means 24 of the microcomputer 14, the VTR of the corresponding channel is controlled and the operated operator is blinked. Then, when the controlled function operation of the VTR at that channel is ended, the blinking state of that operator is released by the control of the control means 24.

It may be possible that the operators 61A to 61D, 62A to 62D and 63A to 63D are each formed as common operators for the respective channels A to D and that a channel selecting operator (serving also as an indication element) is provided independently.

When such auxiliary control apparatus 14K is employed, in association with the cooperation of the selecting means 41 and the switching means 43 (both in FIG. 8), the plurality of the VTRs $8_1$ to $8_4$ can be controlled through the channels A to D so that it becomes easy to control the plurality of the VTRs.

The operation of the apparatus M for sequentially transmitting the reproduced video signal from the VTR on the basis of the above-mentioned transmission list will be described hereinafter. Since the transmission list is stored in the memory means 25 of the microcomputer 14, the elevator 2 is controlled by the microcomputer 14 in accordance with the above-mentioned transmission list, the tape cassettes 7 are taken out from the racks $1_1$ to $1_n$ of the bin apparatus 1 one by one by the elevator 2, transported sequentially to the predetermined VTR of the VTRs $8_1$ to $8_4$ and then loaded thereonto by the horizontal loading operation. Further, the tape cassette 7 of the VTR whose playback mode is ended is take out from the VTR by the horizontal unloading operation and returned to the original rack of the racks $1_1$ to $1_n$ or the predetermined special rack for returning only by the elevator 2.

When the apparatus M is being operated, if the VTR corresponding to the transmission list displayed on the monitor television receiver 14M is in the playback mode, "PLAY" is displayed on the monitor television receiver 14M, while if it is in the playback standby mode, "CUE UP" is displayed thereon.

Further, in the case that the plurality of the apparatus $M_1$ to $M_k$ are used, when the playback of all the tape cassettes 7 set on the racks $1_1$ to $1_n$ of one apparatus is ended, new tape cassettes 7 are manually accommodated into the racks $1_1$ to $1_n$ of the apparatus while other apparatus is operated.

There is such a case in which while the apparatus M is operated for transporting the tape cassette 7 in accordance with the transmission list, it becomes necessary to change the transmission list. This will hereinafter be described with reference to a function block diagram of FIG. 15 of the microcomputer 14 and a flow chart of FIG. 16.

Figure 15:
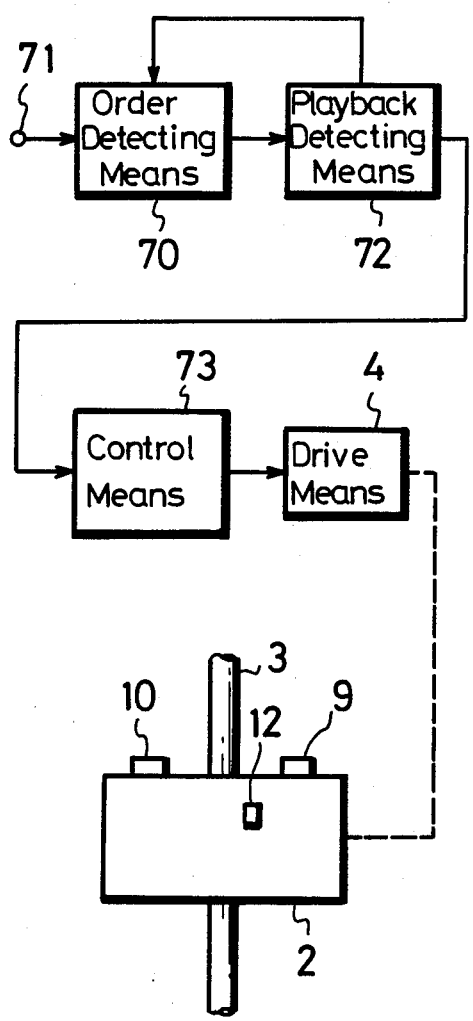
FIG. 15 is a block diagram showing other function of the microcomputer used in the apparatus of this invention shown in FIG. 1.
Figure 16:
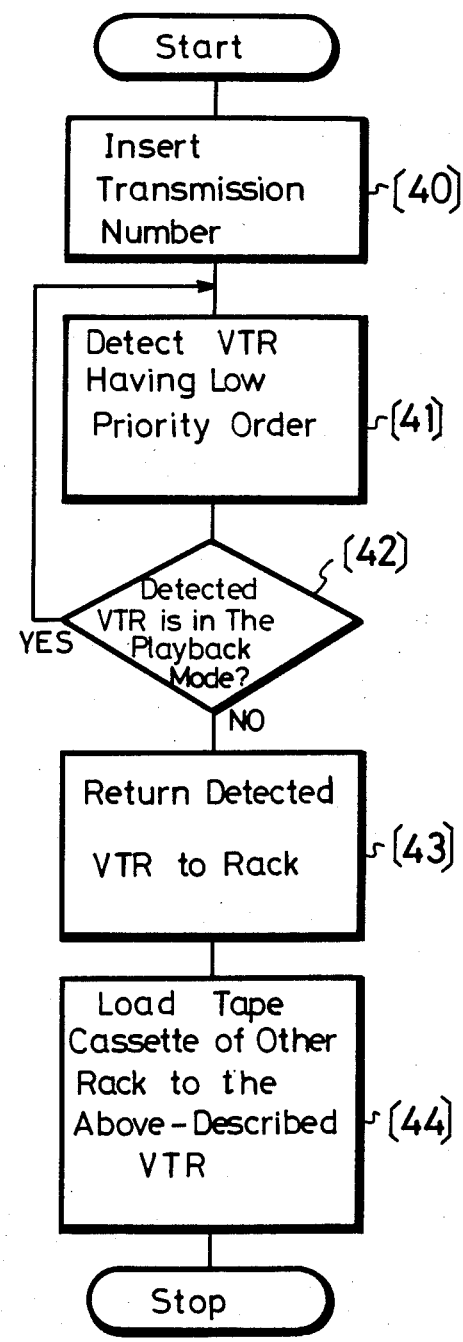
FIG. 16 is a flow chart useful for explaining the function block of FIG. 15.

A description will first be given to a case in which the tape cassette 7 is already loaded onto the VTR and this tape cassette 7 is exchanged by other tape cassette 7. That is, let it be assumed that the VTRs $8_1$ to $8_4$ are all loaded with the tape cassettes 7. In FIG. 15, reference numeral 70 designates a detecting means for detecting the VTR having a low priority order and reference numeral 71 an input terminal to which an insertion command signal of the transmission number is applied. When the insertion command signal of the transmission number from the input terminal 71 is applied to the detecting means 70 in step 40, the detecting means 70 detects the VTR having the lowest priority order at that time point in step 41. The data indicative of the detected VTR is supplied to a detecting means 72 which detects whether the corresponding VTR is in the playback mode or not in step 42. If it is in the playback mode, the detected data is supplied to the detecting means 70 which then detects once again the VTR having the lowest priority order at that time point. In step 42, if the detecting means 72 detects that the VTR detected by the detecting means 70 is not in the playback mode, the detected data is supplied to a control means 73. The control means 73 controls the elevating and driving means 4 (FIG. 1) and the elevator 2 is driven and then controlled so as to return the tape cassette 7 of the detected VTR to any one of the racks $1_1$ to $1_n$ in step 43 and to take out the tape cassette 7 of the desired transmission number from any one of the racks $1_1$ to $1_n$ to thereby load it onto the detected VTR in step 44. Accordingly, when the turn of the playback of the detected VTR comes, the tape cassette 7 loaded onto that VTR is reproduced.

For example, on the TABLE 2, when the VTR $8_3$ (number 3) accommodating therein the tape cassette 7 of the transmission number 1 is in the playback mode, the VTR having the lowest priority order is the VTR $8_2$ (number 2) which accommodates therein the tape cassette 7 of the transmission number 4. If the VTR $8_2$ is not in the playback mode, the tape cassette 7 loaded onto the VTR $8_2$ is replaced with the tape cassette 7 of, for example, the transmission number 10 or 125. Further, if the VTR $8_3$ (number 3) with the tape cassette 7 of the transmission number 1 and the VTR $8_2$ (number 2) with the tape cassette 7 of the transmission number 4 are both in the playback mode, the VTR having the next lowest priority order is the VTR $8_3$ (number 3) which accommodates therein the tape cassette 7 of the transmission number 7. Accordingly, the tape cassette 7 loaded onto the VTR $8_3$ may be exchanged by the tape cassette 7 of, for example, the transmission number 10 or 125. In this case, the tape cassette 7 of the transmission number 10 is accommodated in any one of the racks $1_1$ to $1_n$ in advance and whose sequential order in transmission is changed and the tape cassette 7 of the transmission number 125 is accommodated in any one of the racks $1_1$ to $1_n$ just after the apparatus M starts the transmission operation (in this case, the rack must be designated and the bar code 11 of the corresponding tape cassette 7 must be read by the detector 12 provided on the elevator 2) or accommodated in advance into any one of the racks $1_1$ to $1_n$ as a spare.

As described above, if the insertion of the transmission number is carried out, the playback start time of the tape cassette 7 of the following transmission number is delayed by the calculation of the control means 24 in the microcomputer 14 and then the corrected transmission list including the item of the inserted transmission number is displayed on the picture screen of the monitor television receiver 14M.

A plurality of transmission numbers may be inserted simultaneously. For example, when two transmission numbers are inserted simultaneously, of the VTRs $8_1$ to $8_4$, the tape cassettes 7 accommodated in the VTRs having third and fourth priority orders may be replaced with other two tape cassettes 7 at the same time.

Consequently, it is possible to transmit or insert the desired transmission number, or to insert the reproduced signal of the desired tape cassette 7 into the transmission list easily and positively.

In this case, a part of the transmission list can be erased.

Further, when the apparatus M is being operated, if the blank period (the switching period of the VTR) is inserted between the transmission numbers of some channels, the channel following the insertion of the blank period is changed and the different VTR is operated during the period around that blank period so that the special effect such as the fade-in, fade-out and so on can be effected. In this case, considering the channel to which the blank period is inserted and the following channel, the channel following the blank period is changed to a channel different from both of the channel with the blank period and the channel following the channel with the blank period.

This operation will be described with reference to FIG. 17 which shows a function block of the microcomputer 14 (FIG. 1) and FIG. 18 showing a flow chart.

In FIG. 17, reference numeral 80 designates a channel detecting means which detects the channel to which the blank period is inserted in step 50. Reference numeral 81 designates an input terminal to which a blank period insertion command signal is applied. When the blank period insertion command signal is applied from the input terminal 81 to the channel detecting means 80, the channel detecting means 80 detects the channel to which the blank period is inserted in step 51. When the channel into which the blank period is inserted is detected by the channel detecting means 80, the detected data is supplied to a channel detecting means 82 which then detects the next channel in step 52. The detected data from the both channel detecting means 80 and 82 are supplied to a channel changing means 83 by which the channel following the blank period of the channel to which the blank period is inserted is changed into other channel than the channels detected by the both channel detecting means 80 and 82 in step 53 and then stored in the memory means 25.

In the transmission list on the TABLE 1, if the blank period (duration of time is zero) is inserted between, for example, the transmission numbers 1 and 2, the channels of the transmission numbers 2 and 3 are both changed from A to C (or D). In this case, however, the channel A of the transmission number 1 remains as it is.

Accordingly, the sequential order of the channels is not changed on the whole but is changed partially. In addition, there is no fear that by the insertion of the new blank period, the existing other blank period (the period whose duration of time is particularly zero or short) is erased to thereby disable the above-described special effect such as fade-in, fade-out and so on to be produced.

The blank period can be removed. In that case, the channel following the blank period is changed so as to become the same as the channel preceding the blank period.

In the TABLE 1, if the blank period between the transmission numbers 3 and 4 is removed, the channels of the transmission numbers 4 to 6 are changed from B to A, respectively. If the blank period between the transmission numbers 3 and 4 has zero or short duration of time, the generation of the special effect is stopped.

When the elevator 2 in the apparatus M becomes out of order, since there is a fear that the bar code 11 of the tape cassette 7 can not be read out by the photo detector 12, as shown in FIG. 19, an auxiliary bar code reader (a manual bar code reader) 85 is attached to the elevator 2 (or it may be provided independently). This manual bar code reader 85 is provided with a photo detector 12' which detects the bar code 11 attached to the back surface of the tape cassette 7. The detected signal from the photo detector 12' is supplied through an A/D converter 13' to the above-described microcomputer 14.

When the elevator 2 becomes out of order, the tape cassette 7 is loaded onto the auxiliary bar code reader 85 and the tape cassette 7 is manually moved in the forward direction and in the reverse direction repeatedly. Then the data detected by the photo detector 12', or the identifying data of the tape cassette 7 is stored in the memory means 25 of the microcomputer 14. Thereafter, this tape cassette 7 is loaded onto a vacant VTR of the VTRs $8_1$ to $8_4$ whose priority order is low, wherein when the turn of the playback mode of such VTR comes as usual operation, that tape cassette 7 is reproduced by the corresponding VTR.

When the apparatus M is being operated in accordance with the transmission list previously made (formed of, for example, the transmission numbers 1 to 35), if the elevator 2 becomes out of order, the operation to be performed will be described with reference to FIGS. 20A to 20C each of which illustrates the transmission lists displayed on the picture screen of the monitor television receiver 14M. In FIGS. 20A to 20C, respective items and references of the contents thereof are respectively used as in the following sense.

NO: transmission number
MD: mode identifying number
TTL: title
STT: tape playback start time
DRT: tape playback time
ACT: tape playback integrating time
M: tape cassette supplying apparatus
BN: rack
CH: channel
VT: VTR
VTM: mode of VTR
PLY: in the playback mode
CUE: in the playback standby mode.

Let it be assumed that as shown in FIG. 20A, under the condition that the VTRs of the transmission numbers 15 and 16 are in the playback mode, while the VTR of the transmission number 17 is in the standby mode, the elevator 2 becomes out of order. In this case, since there is a fear that the VTR number will be changed by the insertion of the transmission number and the like, the VTR number which is after the transmission number of the VTR in its standby mode is not displayed. Accordingly, the display of the column of the rack BN and the display of the rows following the transmission number 18 are erased and the rectangular frame long in the row direction is displayed beneath the transmission number 17 as shown in FIG. 20B. Then, while checking the transmission list presented in the form of a hard copy, the tape cassette 7 of the transmission number 18 is searched from the racks $1_1$ to $1_n$ and the tape cassette 7 thus searched is loaded onto the auxiliary bar code reader 85. After the bar code 11 thereof is read out by the auxiliary bar code reader 85, if this tape cassette 7 is loaded onto the VTR $8_1$ (number 1), the parts of the respective items except the item of the rack in the rectangular frame are filled with the data and then displayed therein. Thereafter, as shown in FIG. 20C, the frame is moved to the next row of the transmission number 18 as shown in FIG. 20C. Under the state shown in FIG. 20C, while the VTRs of the transmission numbers 16 and 17 are in the playback mode, the VTR of the transmission number 18 set in the playback standby mode. This operation will hereinafter be repeated.

In consequence, even if the elevator 2 becomes out of order the playback of the tape cassette 7 by the VTR and the selective transmission thereof become possible by the manual operation.

As the reproducing apparatus, in addition to the VTR, it becomes possible to use an audio tape recorder, a data tape recorder and so on.

Instead of the bar code 11, it is possible to use a magnetic recording or optical recording to thereby attach the identifying data on the back surface of the tape cassette 7 or the like.

As set forth above, according to the present invention, in the apparatus for automatically supplying and selectively reproducing a tape cassette which comprises a bin apparatus having a plurality of racks, a plurality of reproducing apparatus, an elevating and transporting means for receiving and transporting tape cassettes between the bin apparatus and the plurality of reproducing apparatus, a selecting and transmitting means for selectively transmitting reproduced signals from the plurality of the reproducing apparatus and a main control means for controlling the plurality of reproducing apparatus, the elevating and transporting means and the selecting and transmitting means, the transmission number or the like of the tape cassette can be inserted into the reproduced transmission list of the tape cassette easily and positively.

The above description is given on a single preferred embodiment of the invention, but it will be apparent that many modifications and variations could be effected by one skilled in the art without departing from the spirit or scope of the novel concepts of the invention, so that the scope of the invention should be determined by the appended claims only.

I claim as my invention:

1. An apparatus for automatically supplying and selectively reproducing a tape cassette having a plurality of cassette accommodating racks into which a plurality of tape cassettes are accommodated, a plurality of reproducing apparatus for reproducing said plurality of tape cassettes, a tape cassette transporting apparatus for transporting said plurality of tape cassettes from said tape cassette accommodating racks to said plurality of reproducing apparatus and for transporting said plurality of tape cassettes from said plurality of reproducing apparatus to said tape cassette accommodating racks and a control apparatus for controlling at least a sequential order of reproducing said plurality of tape cassettes and a sequential order of a playback operation of said plurality of reproducing apparatus and assigning a respective transmission number thereto, said apparatus comprising:

(a) switching means having a plurality of reproduced signal input terminals to which reproduced output signals of said plurality of reproducing apparatus are respectively supplied and a plurality of output terminals being controlled by said control apparatus so as to supply said plurality of reproduced signals to predetermined transmission lines;

(b) reproducing apparatus control means having control keys corresponding to said plurality of output terminals and for controlling an operation of said reproducing apparatus, which supply reproduced signals through said switching means to said plurality of output terminals, by operating said control keys; and (c) in which said control apparatus includes means for placing blank periods of predetermined lengths between selected ones of the plurality of tape cassettes in said sequential order and memory means for storing data representing the transmission number and blank periods and upon read out therefrom to a blank period detecting means, the data representing the transmission number next preceding each blank period is placed back in said memory for supply to a tape cassette number calculating means for forming groups of said tape cassettes, whereby tape cassettes can be efficiently distributed to the plurality of reproducing apparatus in said groups.

2. An apparatus for automatically supplying and selectively reproducing a tape cassette as claimed in claim 1, wherein said control apparatus further includes command means for commanding an interruption playback operation to said sequential order of reproducing said plurality of tape cassettes, and means responsive to a command signal from said command means and for loading a tape cassette which is to be reproduced in said interruption playback mode to a reproducing apparatus having a lowest priority order of use in said plurality of reproducing apparatus by said tape cassette transporting apparatus.

* * * * *